United States Patent [19]

Williams

[11] Patent Number: 4,714,438
[45] Date of Patent: Dec. 22, 1987

[54] ELECTRIC CABLE JOINTS

[75] Inventor: Ronald D. Williams, St. Helens, England

[73] Assignee: BICC Public Limited Company, London, England

[21] Appl. No.: 880,030

[22] Filed: Jun. 30, 1986

[30] Foreign Application Priority Data

Jul. 19, 1985 [GB] United Kingdom ................ 8518256
Oct. 8, 1985 [GB] United Kingdom ................ 8524781

[51] Int. Cl.⁴ .................... H01R 13/53; H01R 13/658
[52] U.S. Cl. .................................. 439/610; 439/932; 439/934; 174/73 R
[58] Field of Search ............... 339/143 R, 143 C, 111, 339/DIG. 1, DIG. 3, 59 R, 59 M, 60 R, 60 C, 60 M; 174/73 R, 73 SC

[56] References Cited

U.S. PATENT DOCUMENTS 4,383,131 5/1983 Clabburn ............................ 174/73

OTHER PUBLICATIONS

BICC Publication 838B–BICAST.
BICC Publication 887–BITHANE.
BICC Publication 925A–BITHERM.
BICC Publication J/GB/51/1–BITHERM Jointing Instructions (Single Core).
BICC Publication J/GB/52/1–BITHERM Jointing Instructions (Three Core).
BICC BIMOLD Catalogue.

Primary Examiner—Gil Weidenfeld
Assistant Examiner—Steven C. Bishop
Attorney, Agent, or Firm—Parkhurst & Oliff

[57] ABSTRACT

An electric cable joint (including a termination) comprises at least one inner component heat-shrunk onto a cable or on to at least one part of a cable and at least one outer component of resilient material which is an interference fit with the inner component(s). The heat-shrink component takes up considerable variation in the size of the underlying cable (or part thereof) so that a range of cable sizes can be accommodated by a much smaller number of inner component sizes than in a purely "slip-on" range.

6 Claims, 5 Drawing Figures

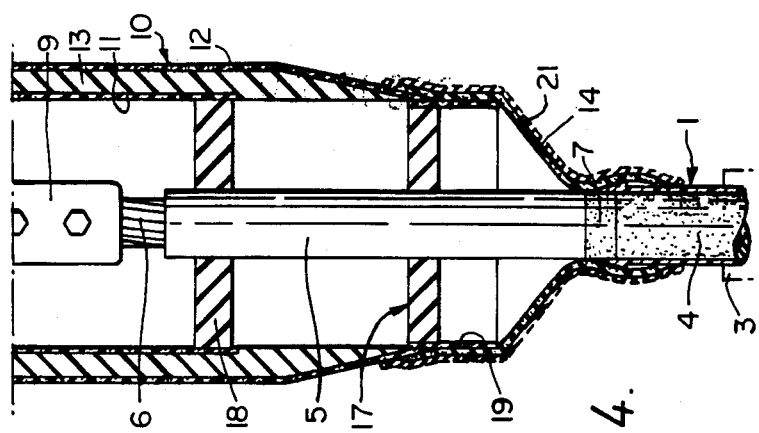
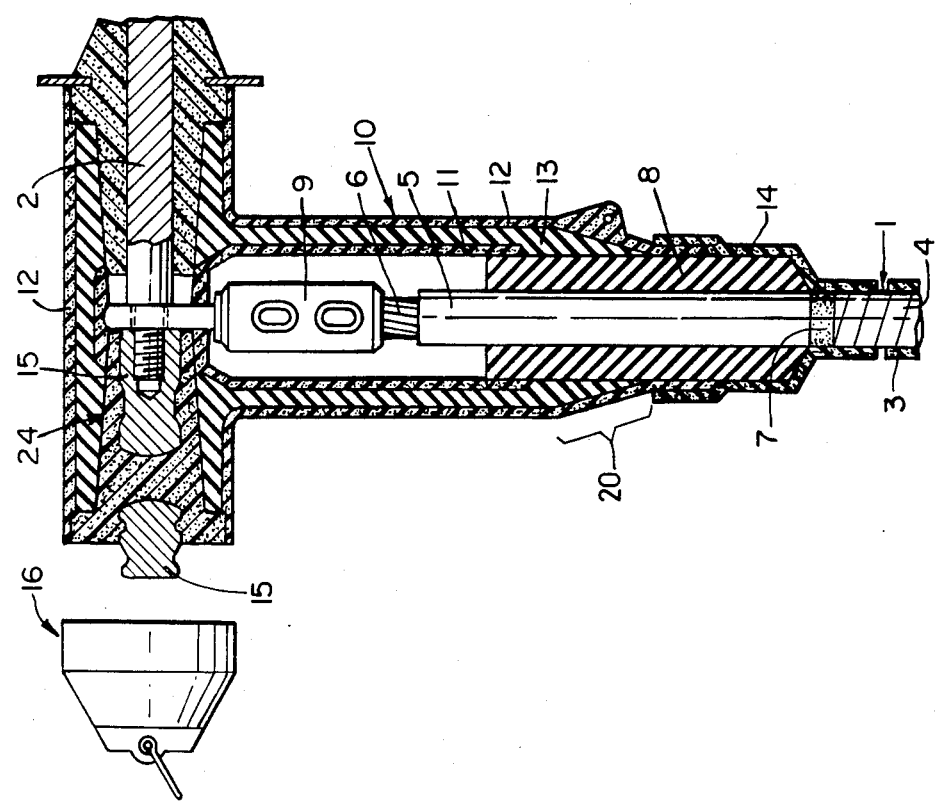

ELECTRIC CABLE JOINTS

BACKGROUND OF THE INVENTION

This invention relates to electric cable joints (including joints between dis-similar conductors, often called 'terminations', as well as joints between similar conductors, always called 'joints') primarily (but not exclusively) for screened cables working at voltages in the approximate range from 1 to 35 kV.

Three types of joint are in regular use in this range:

1. Cast resin joints (such as the applicants' 'Bicast' and 'Bithane' joints). These are effective and reliable in service, but they do not avoid the need for taping operations, and the shelf life of the resins is limited.

2. Slip-on joints (such as the applicants' Bimold joints) made from pre-moulded resilient components interference-fitted together and to the cable or cables. These are also effective and reliable when satisfactorily made, and the parts are of precise dimensions and can be factory-tested; and if necessary the joint can be taken to pieces and the parts re-used. However, joints of this type have a very limited tolerance range which makes them difficult to assemble if the cable is a little oversize and risks electrical breakdown if a slip-on component is used on a cable only a little below the correct size.

3. Heat-shrink joints (such as the applicants' 'Bitherm' joints at the lower end of the voltage range). These are versatile and convenient but because the heat treatment to produce shrinkage cannot be precisely controlled, have unpredictable finished dimensions in the longitudinal direction (and sometimes unpredictable shapes), which may complicate the design of associated cable supports or other equipment; discharge testing is impracticable, and the parts can only be separated destructively.

SUMMARY OF THE INVENTION

The present invention provides a range of joints which combines the use of slip-on and heat-shrink techniques to secure the main advantages of each.

In accordance with the invention, an electric cable joint (as defined) comprises at least one inner component heat-shrunk onto a cable or onto at least one part of a cable and at least one outer component of resilient material which is an interference fit with the inner component.

Usually both the inner component and the outer component will be exposed to the electric field.

The inner component should be of significant wall thickness, preferably such that its cross-sectional area is at least equal to that of the cable, or cable part(s), to which it is applied. Because the wall thickness of heat-shrinkable material normally increases during shrinkage (an effect which can be enhanced, if desired, by expanding the material lengthwise as well as radially, through it will then shrink longitudinally to a much larger extent) the variation in the outer diameter of the heat-shrink inner component can be significantly less than the variation in the diameter of the underlying cable or cable part(s), and moreover the larger diameter over the inner component allows a greater absolute tolerance for the fitting of the outer, resilient component. Consequently, there need be no doubt that components of a particular size will fit the cable for which they were designed, regardless of variations within the manufacturing tolerance of the cable, and indeed the same size components may be designed to make a satisfactory fit on a number of cable sizes.

The invention includes a method of making a cable joint (as defined) comprising applying at least one inner component onto a cable or onto at least one part of a cable by heat shrinking and then applying at least one other component of resilient material by pushing it onto the inner component(s) to form an interference fit therewith.

The inner component may be a simple thick-walled sleeve or it may be shaped and/or incorporate two or more heat-shrinkable materials, depending on its function. For example:

1. A simple sleeve made of an insulating heat-shrunk material may extend across the cut-back end of the dielectric screen of a single-core cable, or of the screen surrounding one core of a multicore screened cable. This may optionally be of high permittivity to modify the electric field distribution and avoid overstressing the dielectric adjoining the cut-back screen end.

2. A tapered insulating body of heat-shrunk material may act as a stress cone, supporting an extension of the cable screen, formed, for example, by a separate thin-walled sleeve of semi-conductive material heat-shrunk over it or by a semi-conductive coating already provided on its surface. It may alternatively act as only the inner part of a stress cone.

3. Heat-shrinkable discs may act as simple supports where the electrical stress distribution permits.

4. A moulded heat-shrink break-out may enclose the crutch area of a stripped-back multicore cable and provide for the support of other components surrounding individual cores and/or all the cores.

The outer component(s) may be of any kind appropriate to the design and purpose of the particular joint. For example, in a single-core straight-through joint it may be a simple tubular component with an insulating body, a thin tubular semi-conductive insert occupying a central zone of the inner surface and a thin semi-conductive coating on the whole of its outer surface. In other cases, however, it may incorporate the whole or an outer part of a stress cone; or a 'shed' to increase surface leakage path; or a tee fitting; or an earthing tag; or a voltage test terminal connected to the cable conductor via a body of semi-conductive material; or more than one of these.

BRIEF DESCRIPTION OF THE DRAWINGS

FIGS. 1-5 are longitudinal cross-sections showing respective examples of joints in accordance with the invention.

The invention will now be further described, by way of example, with reference to the accompanying drawings.

DETAILED DESCRIPTION OF THE PREFERRED EMBODIMENTS

Figure 1:
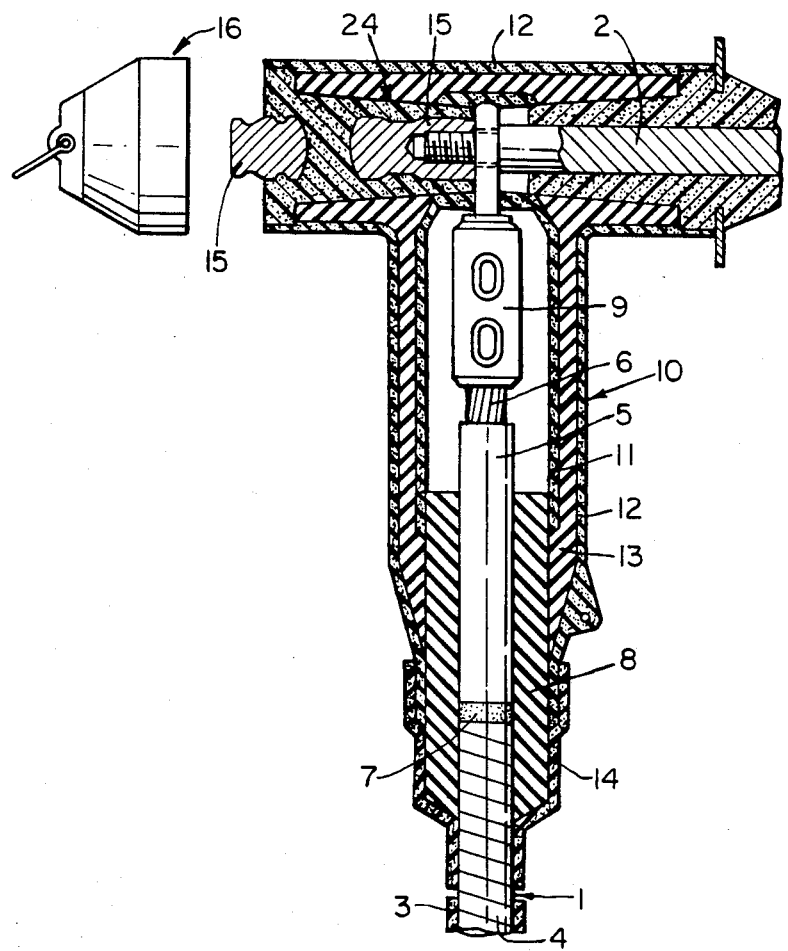

FIG. 1 shows a joint (termination) between a single-core cable 1 and a threaded post terminal 2. The cable-end is prepared in the usual way by cutting-back to remove an end portion of the sheath 3 and expose appropriate lengths of the dielectric screen 4, insulation (or dielectric) 5 and conductor 6. A ring 7 of conductive paint is applied to ensure that there are no conductive sharp edges at the screen end.

In accordance with the invention, a thick walled sleeve 8 of insulating heat-shrinkable material (the inner component) is applied and shrunk to enclose nearly all the exposed dielectric screen 4 and an adjacent section of the insulation 5. After securing a spade fitting 9 to the conductor end (by crimping or soldering) a composite moulding 10 (the outer component) is pushed into place over the heat-shrunk sleeve 8 with which it makes an interference fit; a silicone grease is preferably used to facilitate assembly. The moulding 10, made from an ethylene-propylene-diene terpolymer rubber (EPDM) incorporates an inner insert 11 of carbon-black loaded semi-conductive EPDM, which is at conductor potential when the joint is in service (and so relieves the space within it from electrical stress) and an outer coating 12 of the same semi-conductive material, which is maintained at earth potential and serves both to control the distribution of electrical stress in the main insulating body 13 of the moulding and to provide an external safety screen. Electrical continuity from this outer coating 12 to the cable dielectric screen 4 is established in any convenient way, for example by a semi-conductive heat-shrink sleeve 14, and the joint is completed in a conventional manner by passing the post terminal 2 through the eye of the spade terminal 9, securing it by means of an insulated nut 24 with an epoxy resin body and metal inserts 15, 15 and finally snapping on a cap 16 of insulating EPDM.

Figure 2:
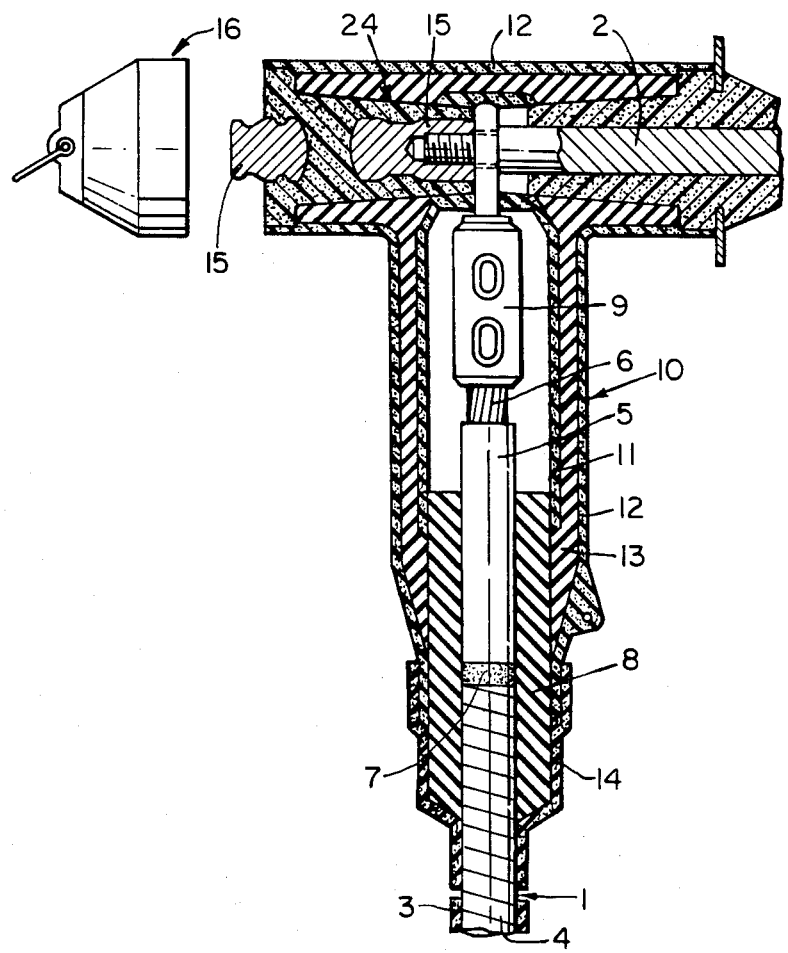

FIG. 2 shows a modification in which the dielectric screen 4 of the cable is stripped back to, and the semi-conducting paint 7 applied at, a point nearer the end of the insulation 5 in order to reduce electrical stress adjacent the feather edge of the insulating body 13.

The design shown in FIG. 3 is also structurally very similar, but in this case the cable screen has been cut back further than in either of the other designs. The heat shrink inner component 8 is positioned so that it only just overlaps the semi-conducting paint 7 and it is formed with a tapered end so that it, together with the semi-conducting tube 14 which is shrunk over it, forms, in the region 20, a stress cone.

In all three cases, the inner heat shrink component 8 may be made either of an ordinary insulating material, preferably with good resistance to tracking, or from a stress grading material of high permitivity.

FIG. 4 shows one half of a straight-through joint between two single-core cables. This is otherwise similar to the joint of FIG. 1 except that the stress-grading sleeve 8 is omitted and instead the moulding 10 is supported on two heat-shrunk insulating discs 17, 18. Disc 17 supports an insulating tube 19 which supports part of the semi-conductive heat-shrink sleeve 14 so as to generate a natural tapered shape which forms a stress-cone. Optionally this sleeve 14 is enclosed by an insulating heat-shrink sleeve 21.

Figure 5:
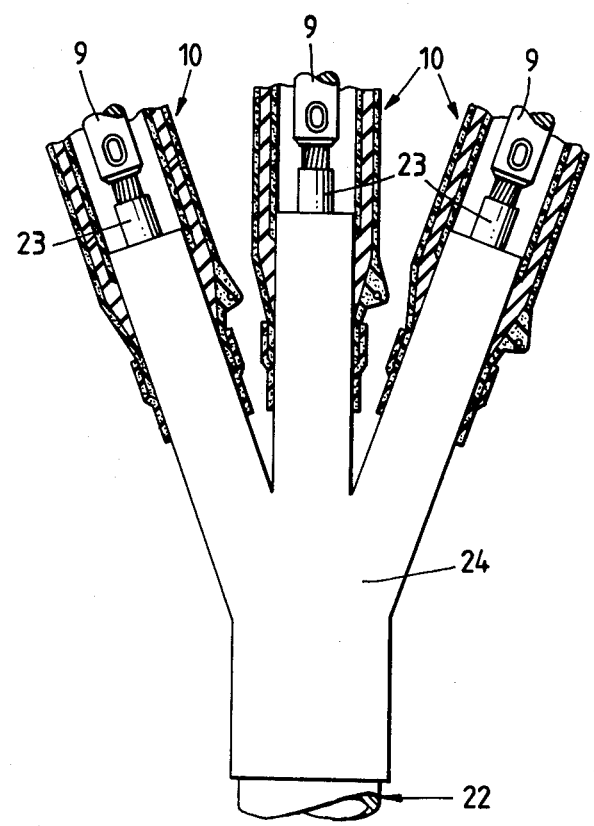

FIG. 5 illustrates a joint for a three core cable 22 in which the crutch area formed by separation of the cores 22 is enclosed by a heat-shrink breakout 24, which fulfils for each of the three cores the function of the inner member (8 in FIGS. 1-3). The fitting 9, outer member 10 and other components (not shown in FIG. 5) may be exactly as shown in FIGS. 1-3.

DIMENSIONAL EXAMPLES

A range of joints of the type shown in FIG. 1 is made using throughout a slip-on outer component (moulding 10) with an internal diameter of 50 mm. Four sizes of heat-shrinkable inner component (sleeve 8) are used as follows:

Size 1 is extruded with inner and outer diameters of 12 and 50 mm (wall thickness 19 mm) and expanded to inner and outer diameters of 43.2 and 65 mm (wall thickness 10.9 mm). This size can be used with cable cores ranging from 12.6 and 26.4 mm in diameter (a range of 13.8 mm or over 100% of the lower limit of the range) to give external diameters between 50.15 and 55.25 mm (a range of 5.1 mm or 10% of the lower limit of the range, which is within the acceptance tolerance of the slip-on outer component). This replaces ten sizes of adaptor in the applicants' 'Bimold' range.

Size 2 is extruded with inner and outer diameters of 22 and 48 mm (wall thickness 13 mm) and expanded to inner and outer diameters of 55.5 and 70 mm (wall thickness 7.25 mm). This size can be used with cable cores ranging from 26.4 and 34.9 mm in diameter (a range of 8.5 mm or over 30% of the lower limit of the range) to give external diameters between 50.16 and 55.12 (a range of 4.96 mm or 10% of the lower limit of the range, which is within the acceptance tolerance of the slip-on outer component). This replaces five sizes of adaptor in the applicants' 'Bimold' range.

Size 3 is extruded with inner and outer diameters of 12 and 49 mm (wall thickness 8 mm) and expanded to inner and outer diameters of 47.8 and 60 mm (wall thickness 6.1 mm). This size can be used with cable cores ranging from 34.9 and 41.7 mm in diameter (a range of 6.8 mm or nearly 20% of the lower limit of the range) to give external diameters between 50.30 and 55.23 (a range of 4.93 mm or 10% of the lower limit of the range, which is within the acceptance tolerance of the slip-on outer component). This replaces four sizes of adaptor in the applicants' 'Bimold' range.

Size 4 is extruded with inner and outer diameters of 39 and 48 mm (wall thickness 4.5 mm) and expanded to inner and outer diameters of 53 and 60 mm (wall thickness 3.5 mm). This size can be used with cable cores ranging from 41.7 and 47.6 mm in diameter (a range of 5.9 mm or over 14% of the lower limit of the range) to give external diameters between 50.21 and 55.21 (a range of 5.0 mm or 10% of the lower limit of the range, which is within the acceptance tolerance of the slip-on outer component). This replaces three sizes of adaptor in the applicants' 'Bimold' range. (The relatively small range-take of the larger sizes is due to the small wall thickness imposed by the decision to use the same size outer component for the whole range, and is not an inherent limitation).

I claim:

1. An electric cable joint comprising:
   at least one cable end having at least one core, said cable end being cut back to expose respective ends of a central conductor, of dielectric material surrounding said conductor and of a dielectric screen surrounding said dielectric material;
   at least one inner component in the form of a sleeve made of an insulating material heat-shrunk onto said core and extending across said end of the dielectric screen;
   and at least one outer component of resilient material which is interference fit with said inner component.

2. An electric cable joint comprising:
   at least one cable end having at least one core, said cable end being cut back to expose respective ends of a central conductor, of dielectric material surrounding said conductor and of a dielectric screen surrounding said dielectric material;
   at least one inner component in the form of a tapered insulating body heat-shrunk onto said core which acts as at least part of a stress cone; and at least one outer component of resilient material which is interference fit with said inner component.

3. An electric cable joint comprising:
   at least one cable end having at least one core, said cable end being cut back to expose respective ends of a central conductor, of dielectric material surrounding said conductor and of a dielectric screen surrounding said dielectric material;
   a plurality of inner components in the form of discs, each disk being heat-shrunk onto said core and acting as a support; and
   at least one outer component of resilient material which is interference fit with said inner components.

4. An electric cable joint comprising:
   at least one cable end having multiple cores, each core being cut back to expose respective ends of a central conductor, of dielectric material surrounding said conductor and of a dielectric screen surrounding said dielectric material;
   an inner component in the form of a molded heat-shrunk breakout shrunk onto said cable and onto each said core thereof; and
   at least one outer component of resilient material surrounding at least one said core which is interference fit with said breakout.

5. In an electric cable joint comprising:
   at least one cut back cable end including a cylindrical portion of a fixed diameter;
   at least one inner component closely fitted onto said cylindrical portion of the cable end to provide an outer cylindrical surface with a predetermined diameter larger than said fixed diameter; and
   at least one outer component of resilient material which is interference fit with said inner component, wherein said inner component is heat-shrunk onto said cylindrical portion of the cable end and is of substantial wall thickness whereby said predetermined diameter may be achieved after shrinkage within the tolerance required for said interference fit, for cylindrical portions with fixed diameters within a substantial range.

6. In a method of making a cable joint comprising:
   cutting back the end of at least one cable end to expose a cylindrical portion of fixed diameter;
   applying at least one tubular inner component onto said cylindrical portion of the cable to provide an outer cylindrical surface with a predetermined diameter larger than said fixed diameter; and
   applying at least one outer component of resilient material by pushing it onto the at least one inner component to form an interference fit therewith, wherein
   said inner component is heat-shrunk onto said cylindrical portion of the cable end and is of substantial wall thickness whereby said predetermined diameter may be achieved after shrinkage within the tolerance required for said interference fit, for cylindrical portions with fixed diameters within a substantial range.

* * * * *